United States Patent
Plott

(10) Patent No.: US 9,915,432 B2
(45) Date of Patent: Mar. 13, 2018

(54) PORTABLE COOKING STOVE

(71) Applicant: North Atlantic Imports, LLC, North Logan, UT (US)

(72) Inventor: Matt Plott, Nibley, UT (US)

(73) Assignee: North Atlantic Imports, LLC, North Logan, UT (US)

(*) Notice: Subject to any disclaimer, the term of this patent is extended or adjusted under 35 U.S.C. 154(b) by 273 days.

(21) Appl. No.: 14/458,875

(22) Filed: Aug. 13, 2014

(65) Prior Publication Data

US 2015/0034066 A1 Feb. 5, 2015

Related U.S. Application Data

(63) Continuation of application No. 12/861,588, filed on Aug. 23, 2010, now Pat. No. 8,820,310.

(60) Provisional application No. 61/370,093, filed on Aug. 2, 2010.

(51) Int. Cl.
*F24C 3/14* (2006.01)
*A47J 37/07* (2006.01)

(52) U.S. Cl.
CPC ............. *F24C 3/14* (2013.01); *A47J 37/0713* (2013.01); *A47J 37/0763* (2013.01); *A47J 2037/0777* (2013.01)

(58) Field of Classification Search
CPC ... A47J 37/0763; A47J 37/0777; F24B 1/205; F24C 3/14
USPC .................................... 126/9 R, 25 R, 29, 30
See application file for complete search history.

(56) References Cited

U.S. PATENT DOCUMENTS

| 2,034,472 | A | 8/1933 | Kesslinger |
| 2,009,792 | A | 7/1934 | Uhl |
| 2,515,521 | A | 7/1950 | Loffredo |
| 2,652,299 | A | 9/1953 | Bryan |
| 2,758,899 | A | 8/1956 | Smith et al. |
| 3,005,451 | A | 10/1961 | Richart |
| 3,123,935 | A | 3/1964 | Williams |

(Continued)

FOREIGN PATENT DOCUMENTS

| DE | 10145231 A1 | 4/2003 |
| FR | 2654913 A1 | 5/1991 |

(Continued)

OTHER PUBLICATIONS

JP 09002165 A—English machine translation.*

(Continued)

*Primary Examiner* — Jorge Pereiro
(74) *Attorney, Agent, or Firm* — David L. Scott

(57) ABSTRACT

A portable cooking stove is disclosed. The cooking stove includes a base structure. At least one burner is positioned within the base structure. A burner plate is positioned above the burner and also above the base structure. When the stove is in use, a cooking surface may be placed on top of the burner plate. Multiple legs are connected to the base structure. The legs can be positioned in an extended configuration in which the base structure is positioned at a certain height above a ground surface. When the legs are positioned in the extended configuration, the height at which the base structure (and therefore the burner plate and any cooking surface that is placed on the burner plate) is positioned above the ground surface is adjustable without removing the legs from the base structure.

20 Claims, 12 Drawing Sheets

(56) References Cited

U.S. PATENT DOCUMENTS

| | | |
|---|---|---|
| 3,144,014 A | 8/1964 | Mantell, Jr. |
| 3,503,324 A | 3/1970 | Gmeiner |
| 3,824,984 A | 7/1974 | Swanson et al. |
| D271,935 S | 12/1983 | Conner |
| 4,492,215 A | 1/1985 | DiGianvittorio |
| 4,623,066 A | 11/1986 | Talbot |
| 5,065,734 A | 11/1991 | Elliott |
| D329,162 S | 9/1992 | Dutro et al. |
| 5,553,601 A | 9/1996 | Parker et al. |
| 5,678,531 A * | 10/1997 | Byers .................. A47J 37/0704 126/25 R |
| D424,364 S | 5/2000 | Persson |
| 6,131,560 A * | 10/2000 | Healy .................. A47J 37/0763 126/25 A |
| 6,182,560 B1 | 2/2001 | Andress |
| 6,196,114 B1 | 3/2001 | Rohloff |
| D444,991 S | 7/2001 | Measom |
| 6,302,097 B1 * | 10/2001 | Rivera .................. A47J 37/0763 126/305 |
| 6,357,344 B2 | 3/2002 | O'Grady et al. |
| 6,539,843 B2 | 4/2003 | Andress |
| 6,595,198 B2 | 7/2003 | Mosher et al. |
| D486,689 S | 2/2004 | Lu |
| 7,080,640 B2 | 7/2006 | Sanders et al. |
| 7,086,395 B1 | 8/2006 | Li |
| D555,426 S | 11/2007 | Lin |
| 7,426,928 B2 * | 9/2008 | Sanders .................. A47J 33/00 108/1 |
| D579,260 S | 10/2008 | Zischke |
| 8,127,694 B2 | 3/2012 | Low |
| 9,032,883 B2 * | 5/2015 | Roy .................. A47B 3/08 108/125 |
| 2002/0050274 A1 | 5/2002 | Hamilton et al. |
| 2002/0148458 A1 | 10/2002 | Andress |
| 2006/0102163 A1 | 5/2006 | Sanders et al. |
| 2006/0169273 A1 | 8/2006 | Li |
| 2006/0225725 A1 | 10/2006 | Rinaldo |
| 2006/0272630 A1 | 12/2006 | Sanders et al. |

FOREIGN PATENT DOCUMENTS

| | | | |
|---|---|---|---|
| JP | 09002165 A | * | 1/1997 |
| JP | 09238753 A | * | 9/1997 |
| JP | 2003061831 A | * | 3/2003 |

OTHER PUBLICATIONS

JP 09238753 A—English machine translation.*
Webpage describing "Single Burner Outdoor Cooker" sold by Camp Chef; retrieved on Aug. 23, 2010.

* cited by examiner

PORTABLE COOKING STOVE

CROSS-REFERENCE TO RELATED APPLICATIONS

The present application is a continuation of U.S. patent application Ser. No. 12/861,588, filed Aug. 23, 2010, which claims the benefit of U.S. Provisional Patent Application No. 61/370,093, filed Aug. 2, 2010, the disclosures of each of which are incorporated by reference herein in their entireties.

BACKGROUND

The present invention relates generally to portable cooking stoves. Portable cooking stoves are useful in a variety of different settings. For example, portable cooking stoves can be used while camping or picnicking, for food preparation in temporary locations for outdoor events such as weddings and other celebrations, for emergency food preparation during disaster relief operations, and in many other situations.

Although several portable cooking stoves are commercially available, known portable cooking stoves suffer from various drawbacks. The present invention is an improved portable cooking stove that provides a variety of features that are not included in known portable cooking stoves.

BRIEF SUMMARY OF THE INVENTION

A portable cooking stove is disclosed. The cooking stove includes a base structure. At least one burner is positioned within the base structure. The cooking stove may include only a single burner. Alternatively, the cooking stove may include multiple burners (e.g., two or three burners). A burner plate is positioned above the burner and also above the base structure. When the stove is in use, a cooking surface may be placed on top of the burner plate. Multiple legs are connected to the base structure. The legs can be positioned in an extended configuration in which the base structure is positioned at a certain height above a ground surface. When the legs are positioned in the extended configuration, the height at which the base structure (and therefore the burner plate and any cooking surface that is placed on the burner plate) is positioned above the ground surface is adjustable without removing the legs from the base structure.

DETAILED DESCRIPTION OF THE INVENTION

Figure 1:
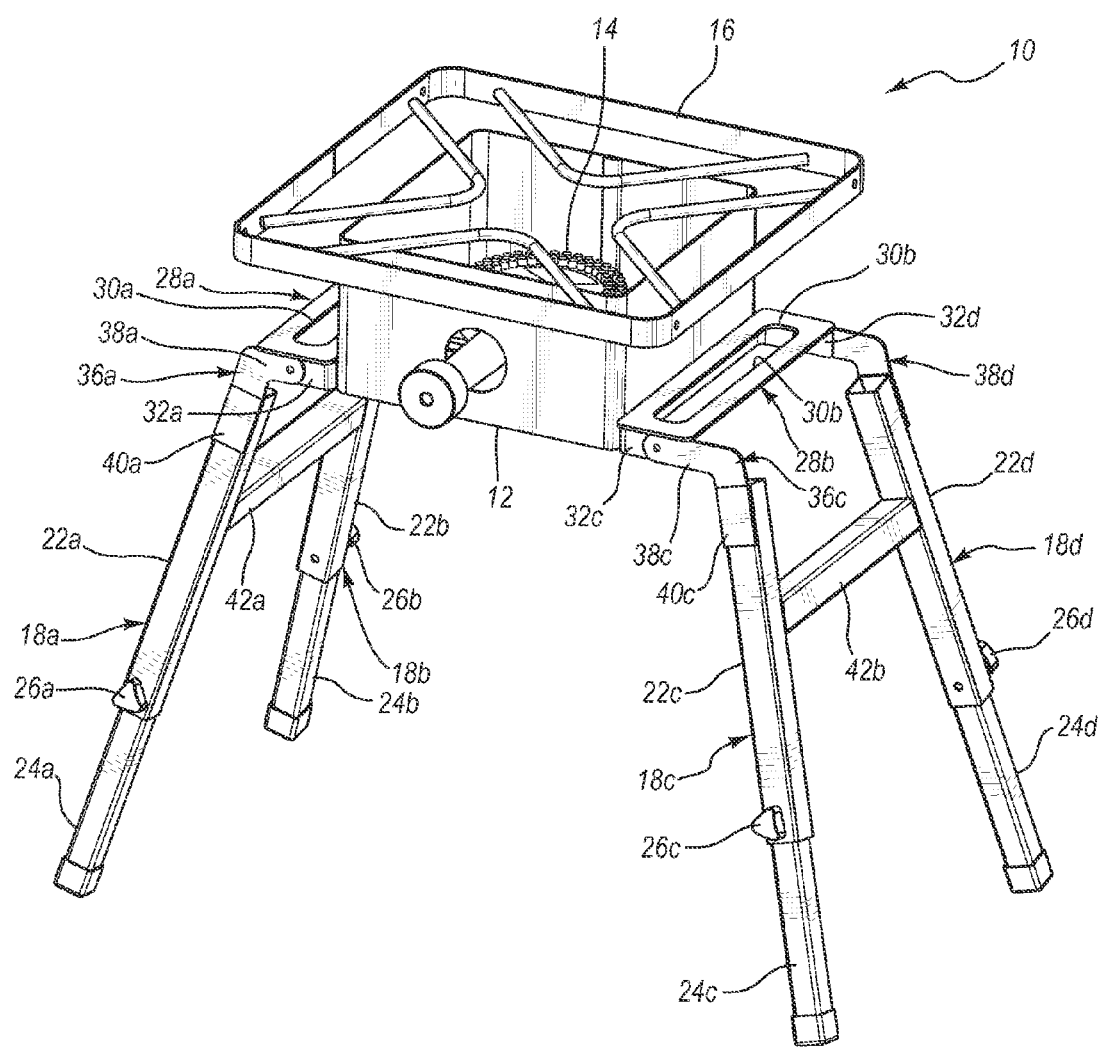
FIG. 1 is a front perspective view of a portable cooking stove in accordance with an embodiment of the invention, with legs of the stove shown in an extended configuration at an intermediate height.

A portable cooking stove 10 in accordance with an embodiment of the invention is shown in FIGS. 1-14. In the following description, reference is made to FIG. 1 unless indicated otherwise.

The stove 10 includes a base structure 12. A burner 14 is positioned within the base structure 12. The burner 14 is a mechanical device that burns a gaseous fuel (e.g., propane) into a flame in a controlled manner. A burner plate 16 is positioned above the base structure 12. When the stove 10 is in use, a cooking surface, such as a grill box, may be placed on top of the burner plate 16.

The stove 10 includes four legs 18, namely, a first leg 18a, a second leg 18b, a third leg 18c, and a fourth leg 18d. The legs 18 are connected to the base structure 12.

The legs 18 are pivotable between an extended configuration and a refracted configuration. In other words, the legs 18 can be pivoted from an extended configuration to a refracted configuration, and vice versa. Thus, the stove 10 is capable of easy setup and disassembly. The legs 18 remain connected to the base structure 12 when the legs 18 are pivoted between the extended configuration and the refracted configuration.

The extended configuration of the legs 18 is shown in FIG. 1. When the legs 18 are in the extended configuration, the base structure 12 (and therefore the burner plate 16 and any cooking surface that is placed on the burner plate 16) is positioned at a certain height above the ground surface. Also, in the extended configuration, the legs 18 are extended downward and outward relative to the base structure 12. Thus, the legs 18 firmly support the base structure 12 at a height that is convenient for cooking tasks.

Figure 11:
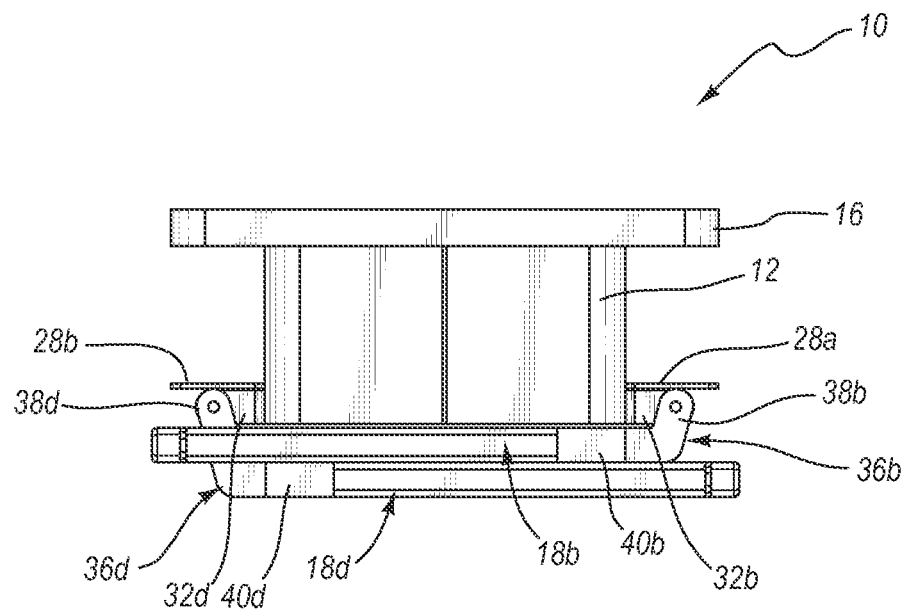
FIG. 11 is a rear view of the portable cooking stove of FIG. 1, with the legs of the stove in the retracted configuration.
Figure 12:
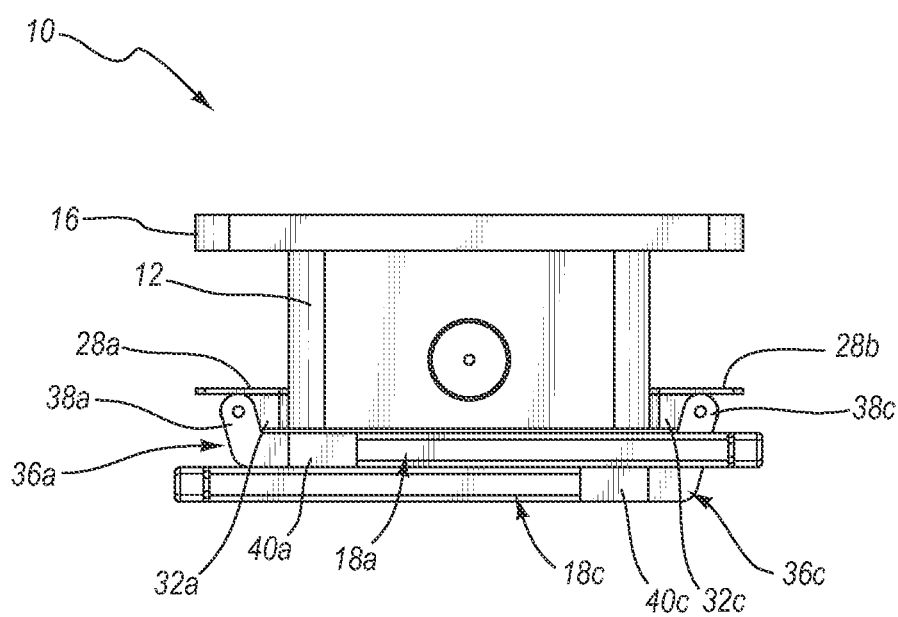
FIG. 12 is a front view of the portable cooking stove of FIG. 1, with the legs of the stove in the retracted configuration.
Figure 13:
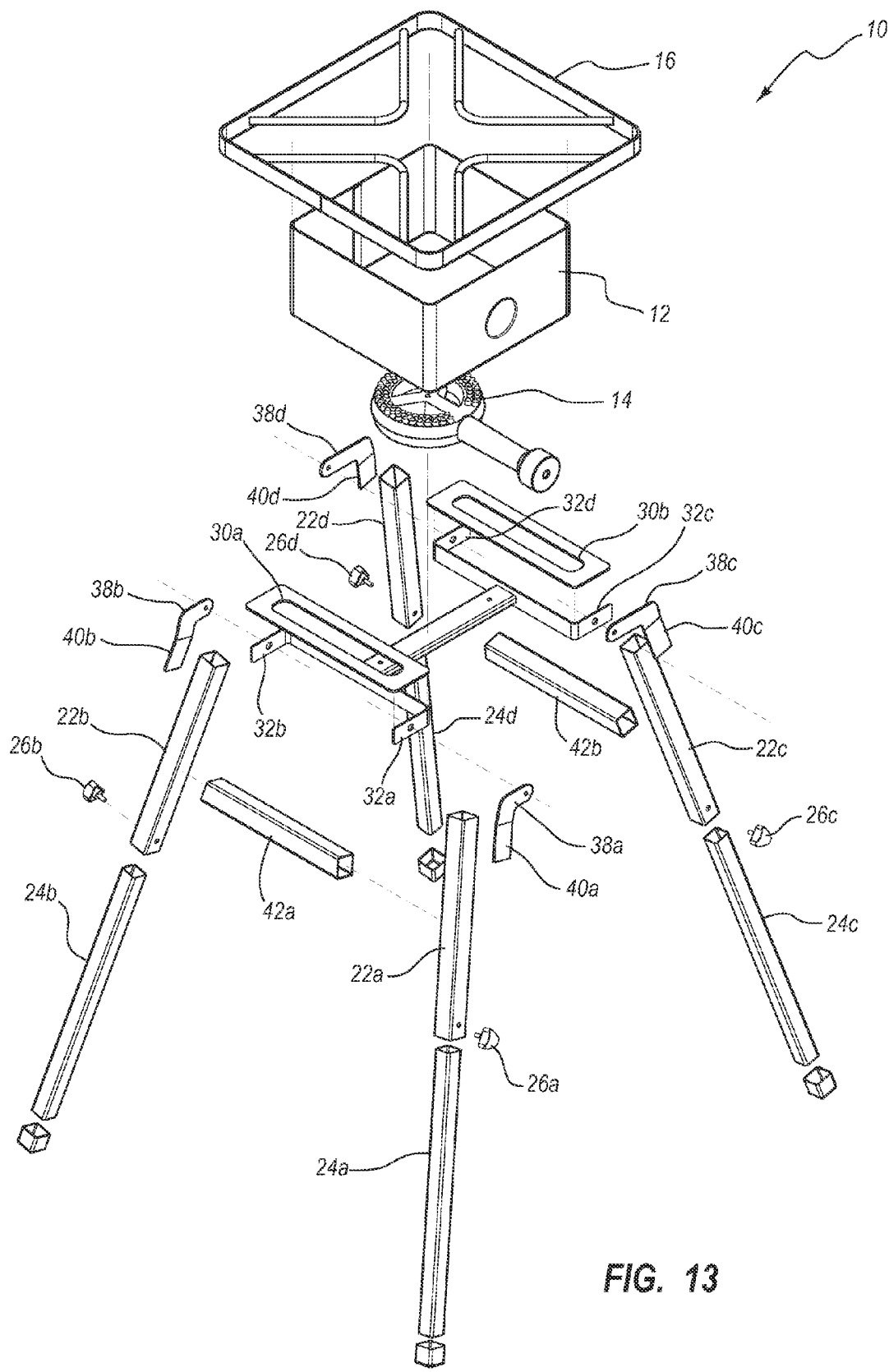
FIG. 13 is an exploded view of the portable cooking stove of FIG. 1.
Figure 14:
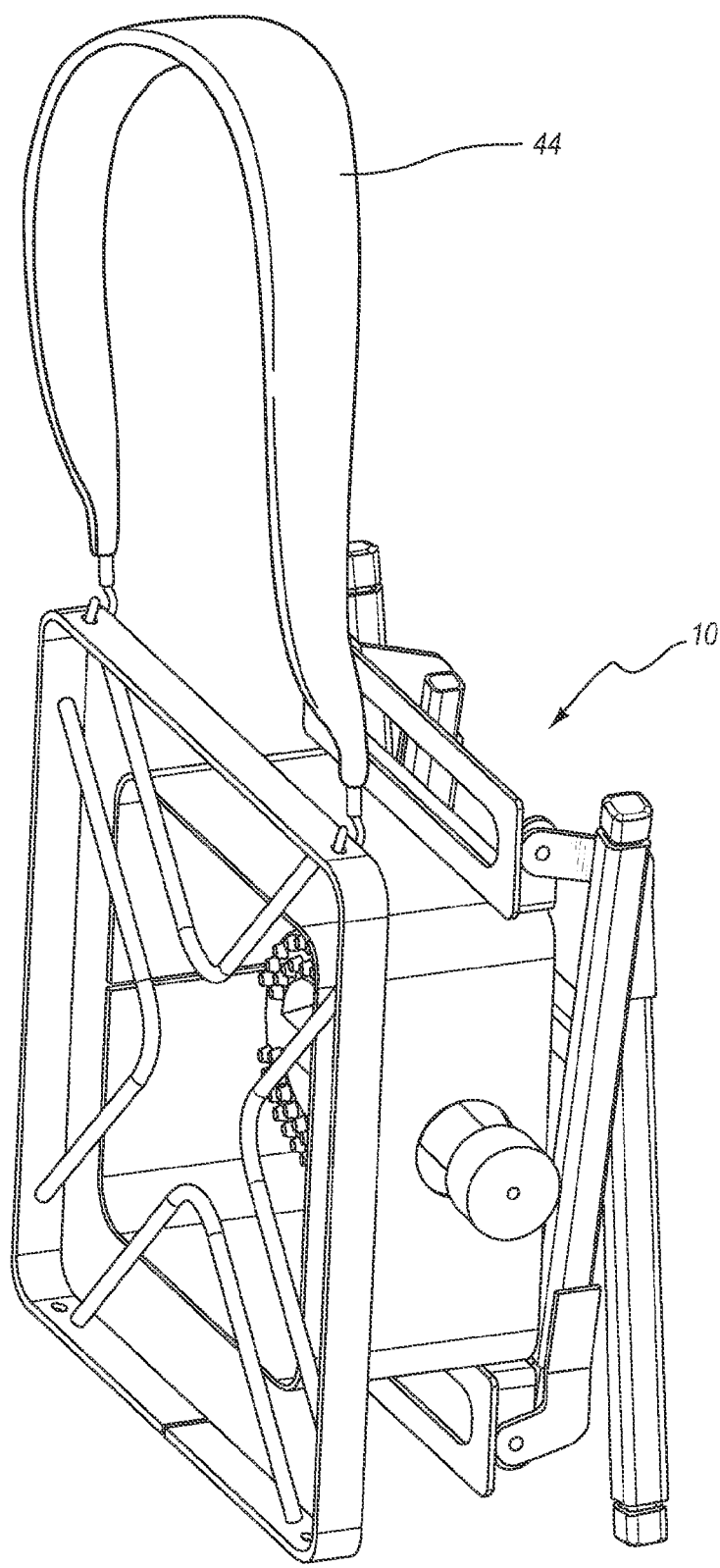
FIG. 14 is a front perspective view of the portable cooking stove of FIG. 1, with a shoulder strap attached to the stove.

The refracted configuration of the legs 18 is shown in FIGS. 11 and 12. When the legs 18 are in the retracted configuration, the legs 18 are positioned underneath the base structure 12, substantially parallel to one another and to the burner plate 16. When the legs 18 are in the retracted configuration, the stove 10 may be used on top of another surface (e.g., a table). Alternatively, the legs 18 may be placed in the retracted configuration when the stove 10 is not in use and is being stored.

The legs 18 are telescoping legs 18. In other words, each of the legs 18 includes an upper section 22 and a lower section 24 that slides in and out of the upper section 22. In particular, the first leg 18a includes an upper section 22a and a lower section 24a, the second leg 18b includes an upper section 22b and a lower section 24b, the third leg 18c includes an upper section 22c and a lower section 24c, and the fourth leg 18d includes an upper section 22d and a lower section 24d.

When the legs 18 are in the extended configuration, the height of a particular leg 18 may be increased by sliding the lower section 24 of the leg 18 out of the upper section 22. Conversely, the height of a particular leg 18 may be decreased by sliding the lower section 24 of the leg 18 into the upper section 22.

Each of the legs 18 also includes a pin 26. When a particular leg 18 has been adjusted to the desired height, the pin 26 for that leg 18 may be inserted through the upper section 22 and also through the lower section 24 in order to lock the lower section 24 in place relative to the upper section 22.

Because the legs 18 are telescoping legs 18, the height of each of the legs 18 is individually adjustable when the legs 18 are in the extended configuration. For example, the height of the first leg 18a can be adjusted independently of the height of any of the other legs 18b, 18c, 18d. The same is true of the second leg 18b, the third leg 18c, and the fourth leg 18d.

Figure 1A:
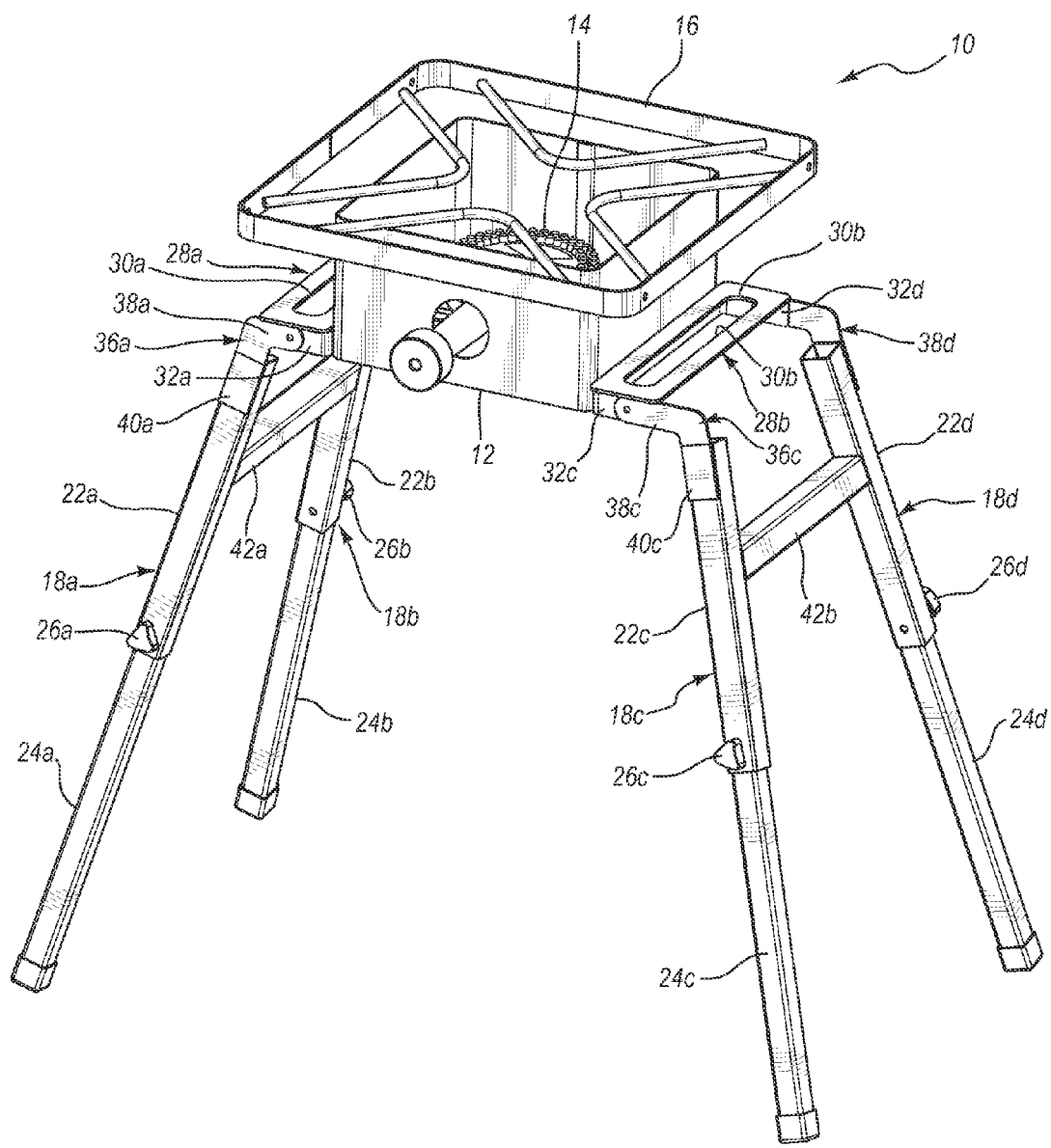
FIG. 1A is a front perspective view of the portable cooking stove of FIG. 1, with the legs of the stove shown in the extended configuration at a maximum height.
Figure 1B:
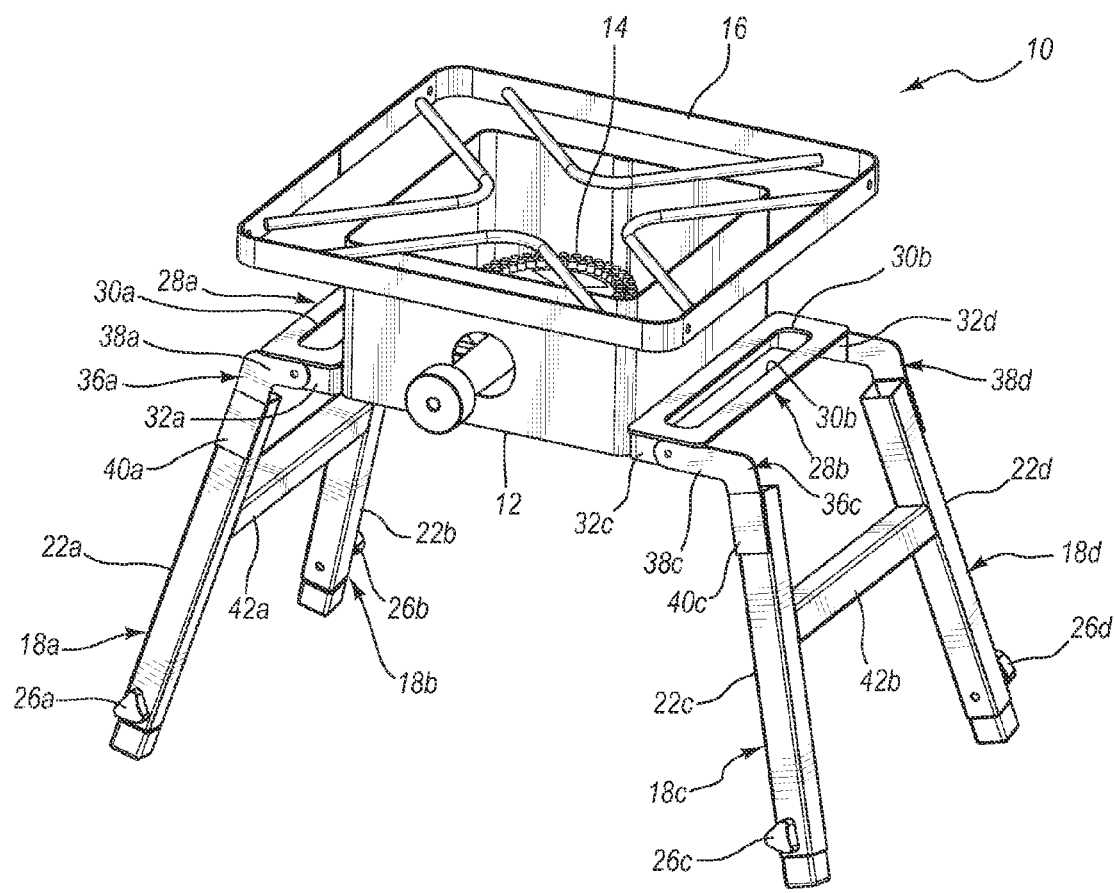
FIG. 1B is a front perspective view of the portable cooking stove of FIG. 1, with the legs of the stove shown in the extended configuration at a minimum height.
Figure 2:
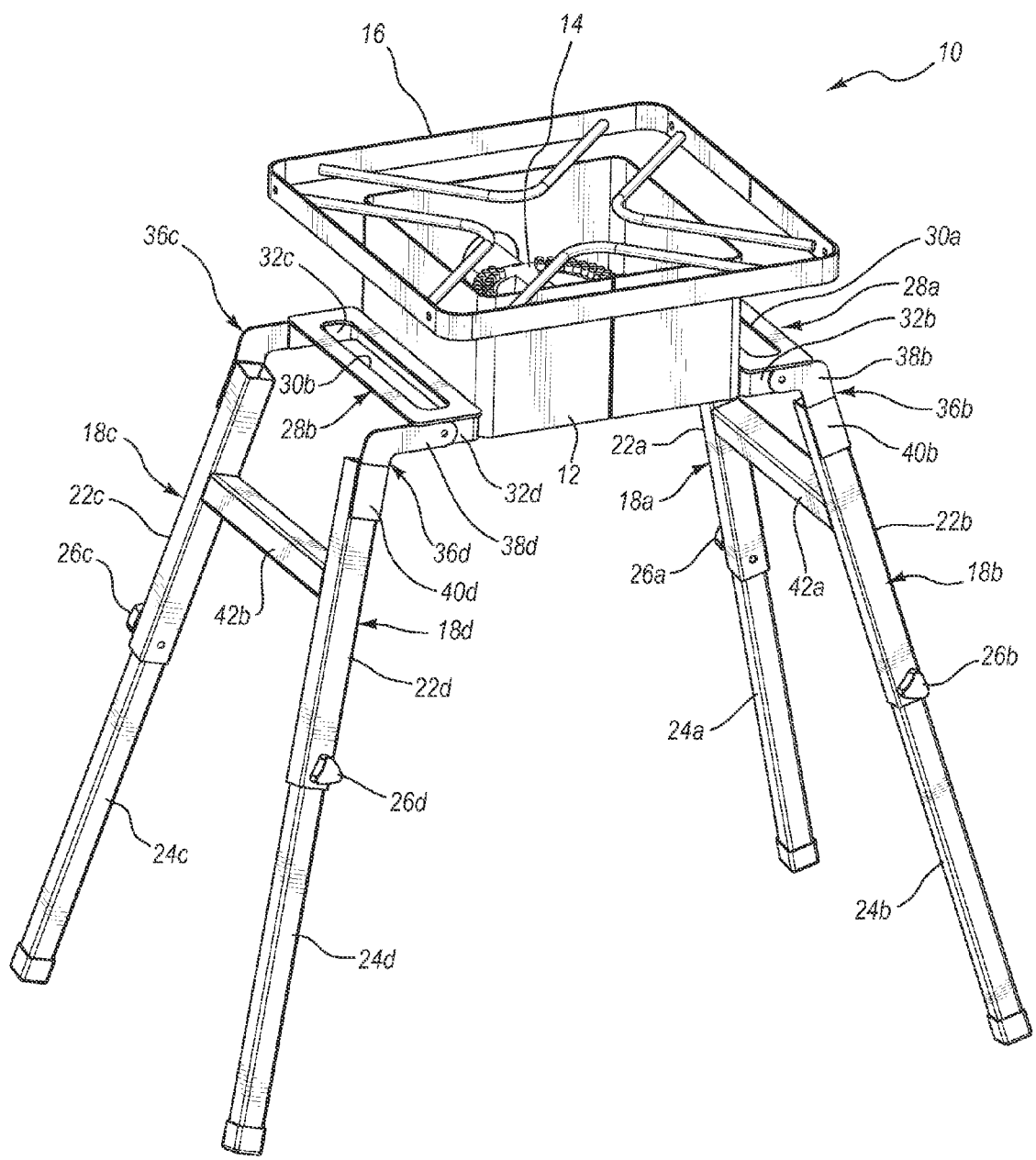
FIG. 2 is a rear perspective view of the portable cooking stove of FIG. 1, with the legs of the stove in the extended configuration.
Figure 3:
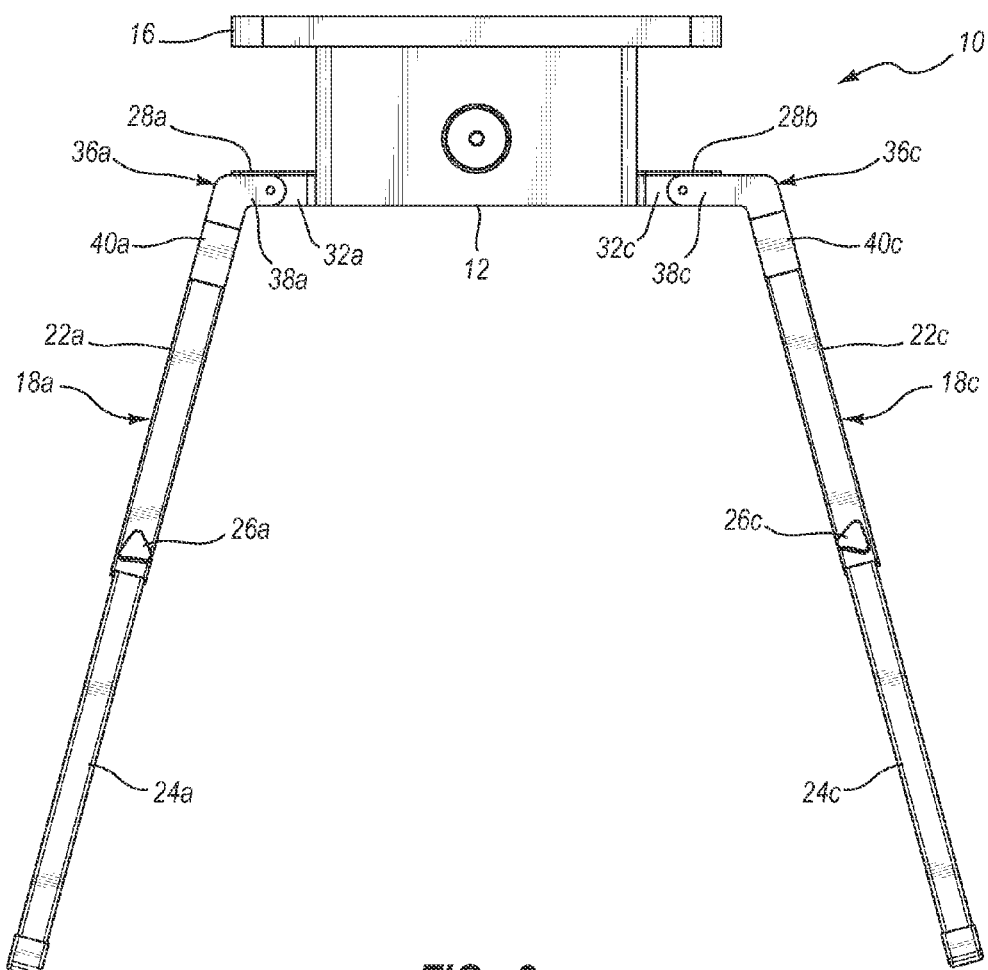
FIG. 3 is a front view of the portable cooking stove of FIG. 1, with the legs of the stove in the extended configuration.
Figure 4:
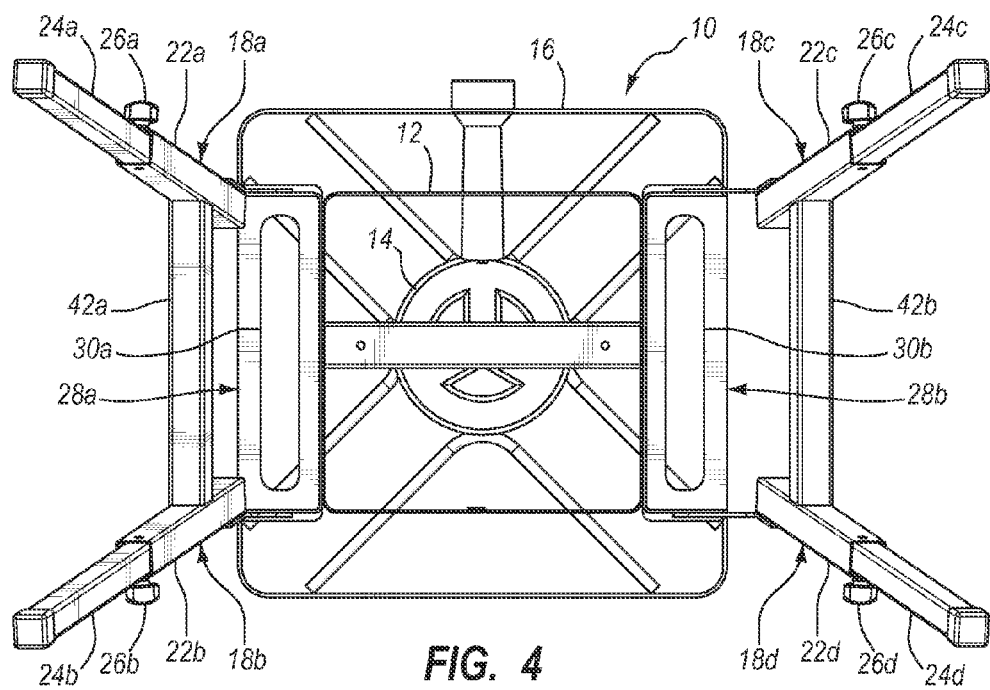
FIG. 4 is a bottom view of the portable cooking stove of FIG. 1, with the legs of the stove in the extended configuration.
Figure 5:
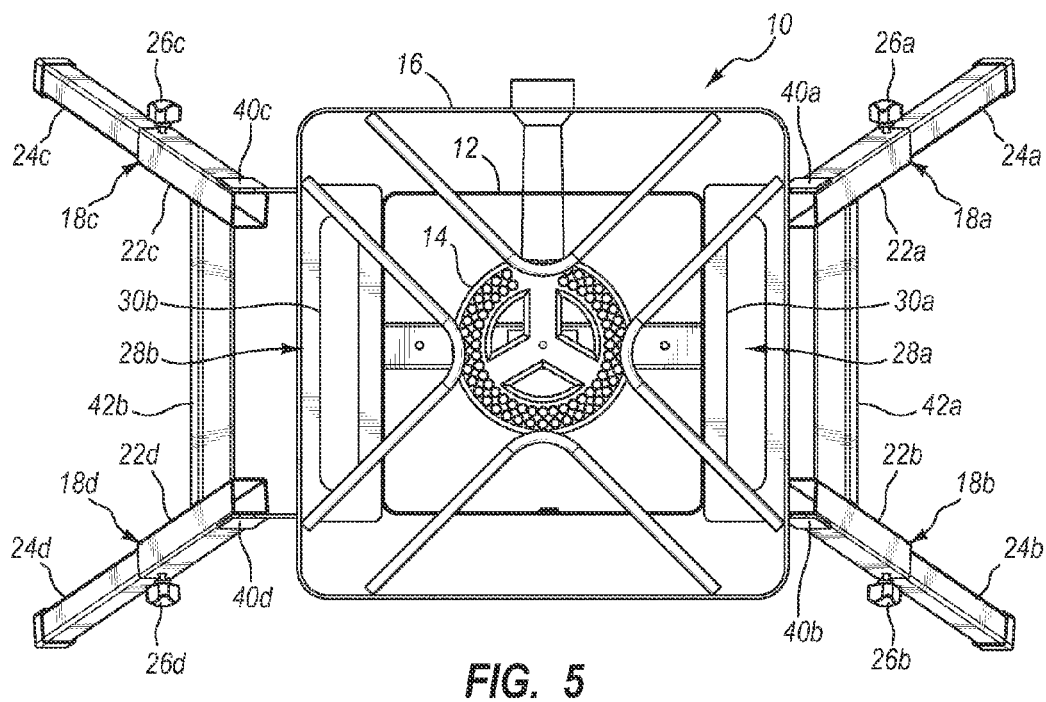
FIG. 5 is a top view of the portable cooking stove of FIG. 1, with the legs of the stove in the extended configuration.
Figure 6:
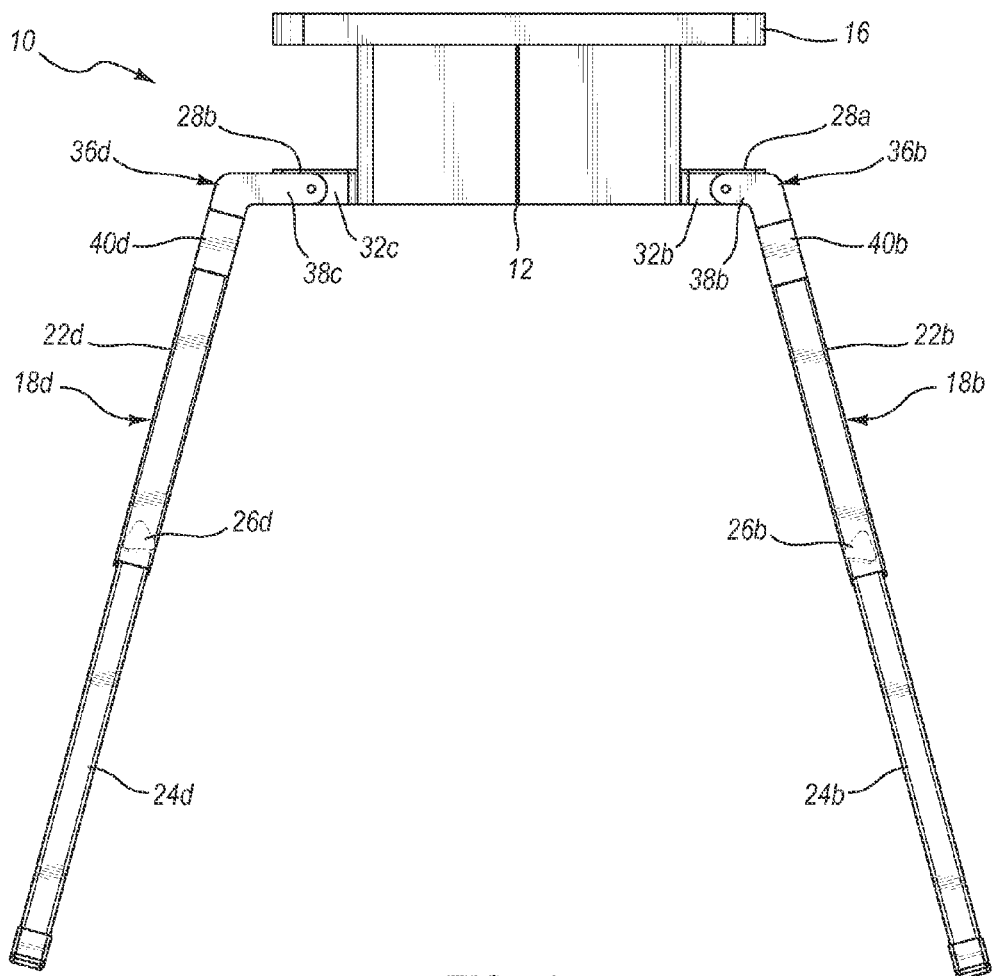
FIG. 6 is a rear view of the portable cooking stove of FIG. 1, with the legs of the stove in the extended configuration.
Figure 7:
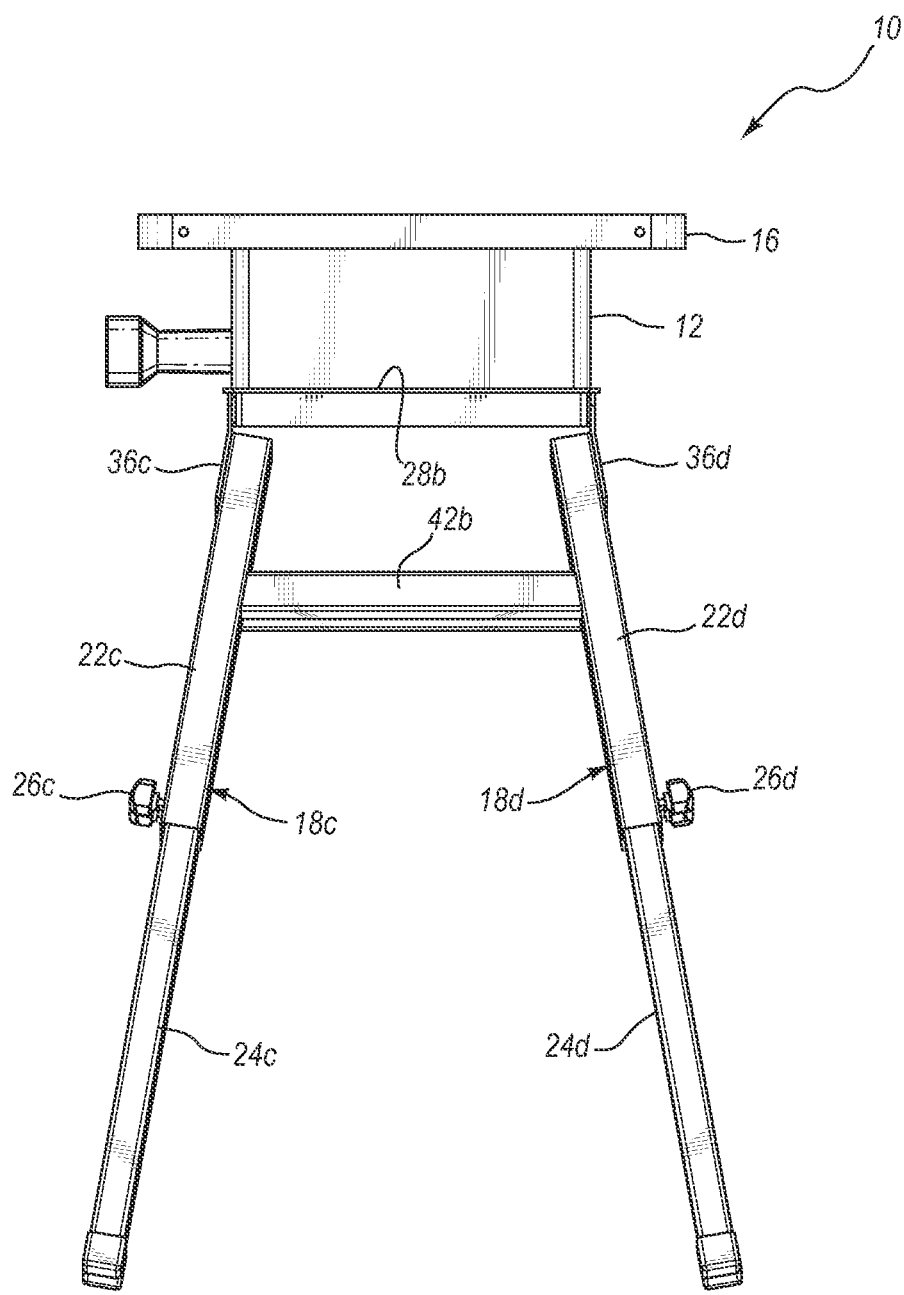
FIG. 7 is a right side view of the portable cooking stove of FIG. 1, with the legs of the stove in the extended configuration.
Figure 8:
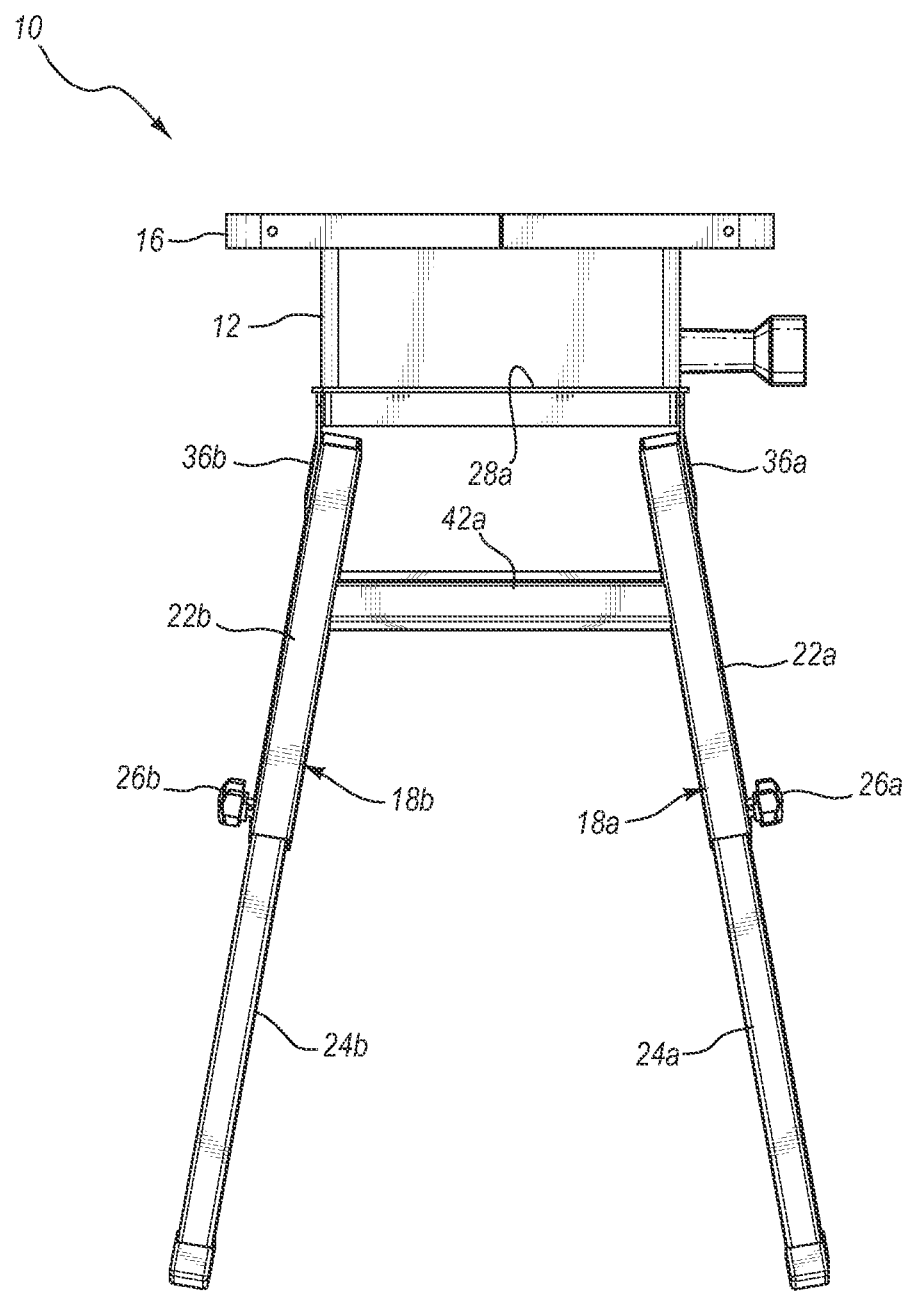
FIG. 8 is a left side view of the portable cooking stove of FIG. 1, with the legs of the stove in the extended configuration.
Figure 9:
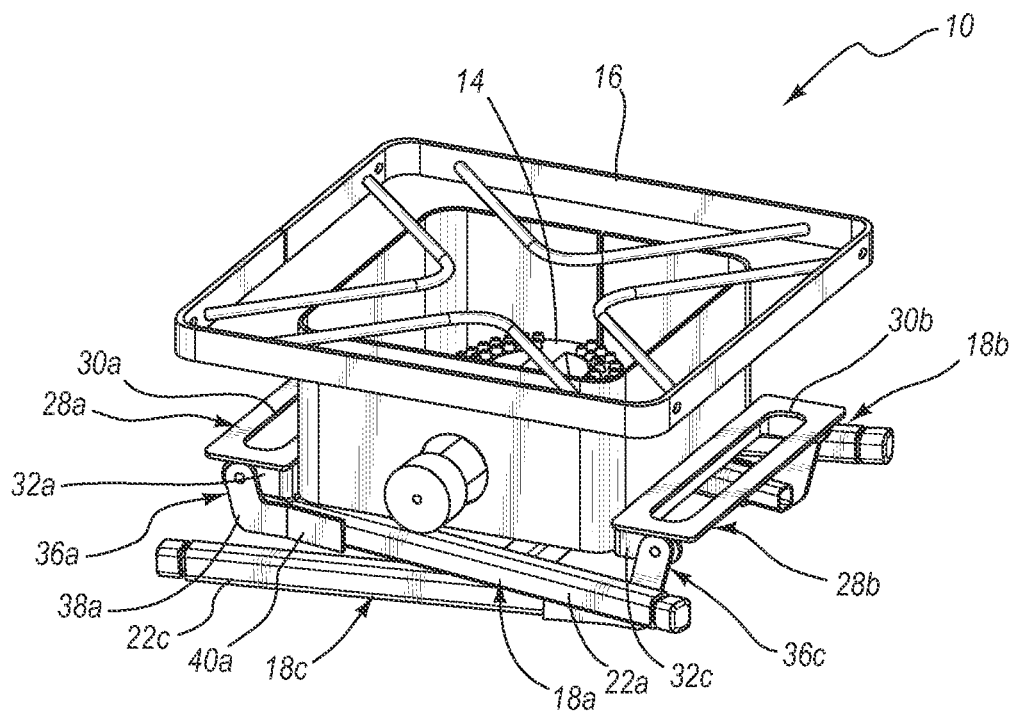
FIG. 9 is a front perspective view of the portable cooking stove of FIG. 1, with the legs of the stove in a retracted configuration.
Figure 10:
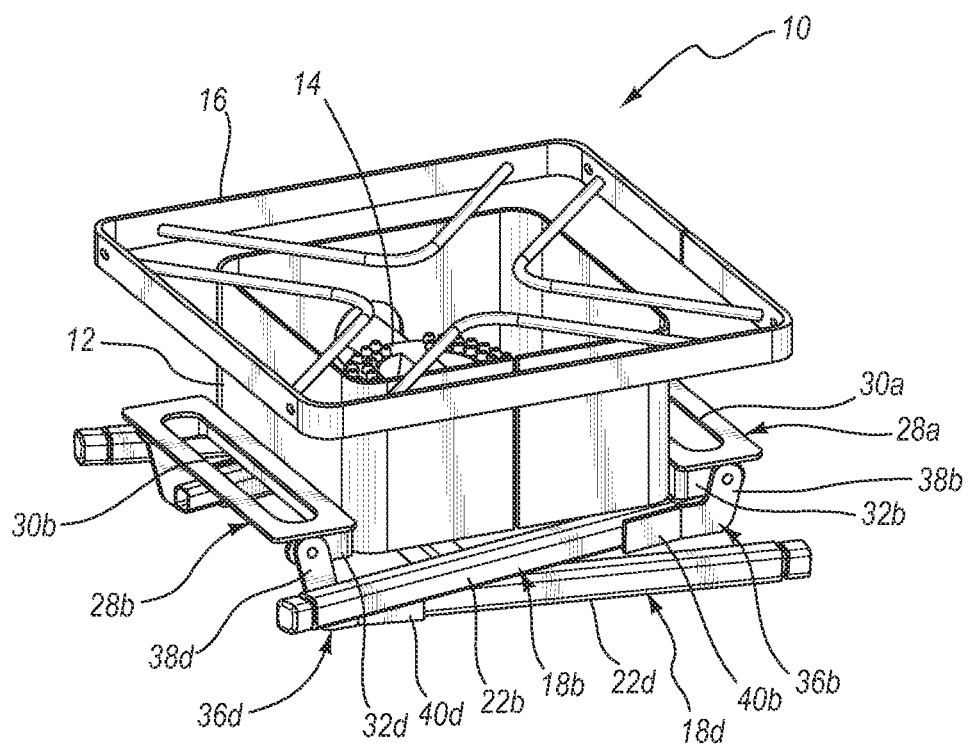
FIG. 10 is a rear perspective view of the portable cooking stove of FIG. 1, with the legs of the stove in the retracted configuration.

Being able to individually adjust the height of each of the legs 18 when they are in the extended configuration may be advantageous for several reasons. For example, the height at which the base structure 12 (and therefore the burner plate 16 and any cooking surface that is placed on the burner plate 16) is positioned above the ground surface can be adjusted to a desired level without removing the legs 18 from the base structure 12. This is illustrated in FIGS. 1, 1A, and 1B, which show the stove 10 with the legs 18 adjusted to an intermediate height (FIG. 1), a maximum height (FIG. 1A), and a minimum height (FIG. 1B), respectively.

Another advantage of being able to adjust the height of each of the legs 18 is that when the stove 10 is being used on uneven ground, the legs 18 can be adjusted to different heights so that the burner plate 16 is substantially level. Thus, even on an uneven surface, the stove 10 can be operated in a substantially leveled condition to prevent spills from pots and pans heated thereon.

The stove 10 includes first and second carrying handles 28a, 28b that are attached to opposite sides of the base structure 12. The carrying handles 28 make it relatively easy to move the stove 10 from one place to another. The stove 10 is light enough that it may be carried by hand, using one or both of the handles 28, when the stove 10 is not in use. To make it even easier to carry the stove 10, a shoulder strap 44 may be attached to the base structure 12 (see FIG. 14).

The carrying handles 28 are positioned so that when the legs 18 are in the extended configuration, the first carrying handle 28a prevents the first and second legs 18a, 18b from being pivoted upward, and the second carrying handle 28b prevents the third and fourth legs 18c, 18d from being pivoted upward.

Each carrying handle 28 includes a slot 30 that runs parallel to the length of the carrying handle 28. In particular, the first carrying handle 28a includes a first slot 30a, and the second carrying handle 28b includes a second slot 30b. The slot 30 within a particular carrying handle 28 allows objects (such as cooking utensils) to be hung from the carrying handle 28 while the stove 10 is in use.

Each carrying handle 28 also includes two attachment plates 32, one at each end of the carrying handle 28. In particular, the first carrying handle 28a includes a first attachment plate 32a and a second attachment plate 32b (see FIG. 2). The second carrying handle 28b includes a third attachment plate 32c and a fourth attachment plate 32d (see FIG. 2). The attachment plates 32 for a particular carrying handle 28 are perpendicular to the carrying handle 28.

The stove 10 includes multiple pivot brackets 36. Each leg 18 is connected to one of the attachment plates 32 of one of the carrying handles 28 via one of the pivot brackets 36. In particular, the first leg 18a is connected to the first attachment plate 32a, which is part of the first carrying handle 28a, via a first pivot bracket 36a. The second leg 18b is connected to the second attachment plate 32b, which is also part of the first carrying handle 28a, via a second pivot bracket 36b (see FIG. 2). The third leg 18c is connected to the third attachment plate 32c, which is part of the second carrying handle 28b, via a third pivot bracket 36c. The fourth leg 18d is connected to the fourth attachment plate 32d, which is also part of the second carrying handle 28b, via a fourth pivot bracket 36d (see FIG. 2).

Each of the pivot brackets 36 includes a first portion 38 and a second portion 40. The first portion 38 is pivotably connected to one of the attachment plates 32 of one of the carrying handles 28. The second portion 40 is connected to one of the legs 18. More specifically, the first portion 38a of the first pivot bracket 36a is pivotably connected to the first attachment plate 32a, which is part of the first carrying handle 28a. The second portion 40a of the first pivot bracket 36a is connected to the first leg 18a. The first portion 38b of the second pivot bracket 36b is pivotably connected to the second attachment plate 32b (see FIG. 2), which is also part of the first carrying handle 28a. The second portion 40b of the second pivot bracket 36b is connected to the second leg 18b (see FIG. 2). The first portion 38c of the third pivot bracket 36c is pivotably connected to the third attachment plate 32c, which is part of the second carrying handle 28b. The second portion 40c of the third pivot bracket 36c is connected to the third leg 18c. The first portion 38d of the fourth pivot bracket 36d is pivotably connected to the fourth attachment plate 32d (see FIG. 2), which is also part of the second carrying handle 28b. The second portion 40d of the fourth pivot bracket 36d is connected to the fourth leg 18d (see FIG. 2).

When the legs 18 are in the extended configuration, the first portion 38 of each of the pivot brackets 36 is substantially parallel to the burner plate 16. Also, for each pivot bracket 36, the first portion 38 of the pivot bracket 36 is joined to the second portion 40 of the pivot bracket 36 so that the smallest angle between the first and second portions 38, 40 of the pivot bracket 36 is greater than 90°. The combination of these two features makes it so that when the legs 18 are in the extended configuration, the legs 18 are extended downward and outward relative to the base structure 12.

The first portions 38c, 38d of the pivot brackets 36c, 36d on one side of the base structure 12 are longer than the first portions 38a, 38b of the pivot brackets 36a, 36b on the other side of the base structure 12. This feature makes it so that the legs 18 can be pivoted to the retracted configuration, in which the legs 18 are positioned underneath the base structure 12, substantially parallel to one another and to the burner plate 16. More specifically, in the refracted configuration, the first leg 18a is positioned on top of the third leg 18c on the front side of the stove 10 (see FIG. 12), and the second leg 18b is positioned on top of the fourth leg 18d on the back side of the stove 10 (see FIG. 11).

The stove 10 also includes a pair of crossbars 42 between each pair of legs 18. More specifically, the stove 10 includes a first crossbar 42a between the first and second legs 18a, 18b, and a second crossbar 42b between the third and fourth legs 18c, 18d. The crossbars 42 provide support to the legs 18, particularly when the legs 18 are in the extended configuration.

As previously discussed, the stove 10 described above is configured so that the height at which the base structure 12 (and therefore the burner plate 16 and any cooking surface that is placed on the burner plate 16) is positioned above the ground surface can be adjusted to a desired level without removing the legs 18 from the base structure 12. With the stove 10 that was just described, adjusting the height of the base structure 12 can be accomplished by adjusting the height of the telescoping legs 18. However, a portable cooking stove in accordance with an alternative embodiment of the present invention may have a different mechanism for adjusting the height of the base structure (and cooking surface). For example, one alternative mechanism for adjusting the height of the base structure is a linkage system that includes a screw jack, where turning the screw jack changes the height of the base structure. Another alternative mechanism utilizes hydraulic jacks. Another alternative mechanism utilizes sliders that are pulled through slots, where pins are used to lock the base structure in place at the desired height. Yet another alternative mechanism utilizes folding legs.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A portable cooking stove, comprising:
a base structure;
a burner positioned within the base structure;
multiple legs operably coupled to the base structure in a pivotable manner, the multiple legs moveable between an extended configuration and a retracted configuration;
first and second carrying handles coupled to opposite sides of the base structure, the first and second carrying handles each defining a slot therein and a downward facing flat leg abutment surface thereon; and
multiple leg attachment plate portions coupled to the base structure, each leg attachment plate portion being positioned to correspond with one of the multiple legs such that each one of the multiple legs are pivotably coupled to the leg attachment plate portion;
wherein the first and second carrying handles are positioned so that, upon the legs being in the extended configuration, the downward facing flat leg abutment surface of the first and the second carrying handles prevent the legs from being pivoted upward.

2. The portable cooking stove of claim 1, wherein each one of the multiple leg attachment plate portions are positioned adjacent to a respective end of the first and second carrying handles.

3. The portable cooking stove of claim 1, wherein the multiple leg attachment plate portions extend in a perpendicular arrangement relative to the first and second carrying handles.

4. The portable cooking stove of claim 1, wherein each of the multiple legs comprise a pivot bracket coupled to one end of the multiple legs so that each of the multiple legs are pivotable relative to the base structure and moveable to the retractable configuration.

5. The portable cooking stove of claim 1, wherein the base structure comprises a burner plate positioned above the burner.

6. The portable cooking stove of claim 1, wherein the multiple legs are positionable in the extended configuration such that the base structure is positioned at a certain height above a ground surface.

7. The portable cooking stove of claim 6, wherein, upon the multiple legs being positioned in the extended configuration, the height at which the base structure is positioned above the ground surface is adjustable without removing the legs from the base structure.

8. The portable cooking stove of claim 1, wherein each of the multiple legs include a length, the length of each of the multiple legs being individually adjustable.

9. The portable cooking stove of claim 1, wherein, upon the legs being in the extended configuration, the multiple legs extend downward and outward relative to the base structure.

10. The portable cooking stove of claim 1, wherein, upon the multiple legs being in the retracted configuration, the multiple legs are positioned below the base structure.

11. The portable cooking stove of claim 1, wherein each of the multiple legs are telescoping legs.

12. The portable cooking stove of claim 11, wherein:
each of the telescoping legs comprises an upper section and a lower section that slides in and out of the upper section; and
each of the telescoping legs comprises a pin that is inserted through the upper section and also through the lower section in order to lock the lower section in place relative to the upper section.

13. The portable cooking stove of claim 1, wherein the multiple legs comprises a first pair of legs and a second pair of legs, the first pair of legs corresponding with the first carrying handle and the second pair of legs corresponding with the second carrying handle.

14. The portable cooking stove of claim 13, wherein the first pair of legs include a first cross-bar extending there between, and wherein the second pair of legs include a second cross-bar extending there between.

15. The portable cooking stove of claim 1, further comprising a shoulder strap attached to the base structure.

16. A portable cooking stove, comprising:
a base structure including a front wall, a rear wall, a first wall and a second wall, the first wall positioned opposite the second wall;
a burner positioned within the base structure;
multiple legs operably coupled to the base structure in a pivotable manner, the multiple legs moveable between an extended configuration and a retracted configuration;
a first carrying handle and a second carrying handle, the first carrying handle coupled to the first wall of the base structure and the second carrying handle coupled to the second wall of the base structure, the first and second carrying handles each defining an elongated slot therein, the first and second carrying handles defining a downward facing flat leg abutment surface thereon; and multiple leg attachment plate portions coupled to the first wall and the second wall of the base structure, each leg attachment plate portion being positioned to correspond with one of the multiple legs such that each one of the multiple legs are pivotably coupled to the leg attachment plate portion;

wherein the first and second carrying handles are positioned so that, upon the legs being in the extended configuration, the downward facing flat leg abutment surface of the first and the second carrying handles prevent the legs from being pivoted upward.

17. The portable cooking stove of claim 16, wherein the first and second carrying handles are elongated and positioned against the first and second wall, respectively, of the base structure such that the first and second carrying handles each extend from adjacent the front wall to adjacent the rear wall of the base structure.

18. The portable cooking stove of claim 16, wherein the first and second carrying handles each define a front underside end portion and a rear underside end portion, the front and rear underside end portions defining the downward facing flat leg abutment surface of the first and second carrying handles.

19. The portable cooking stove of claim 16, wherein each one of the multiple leg attachment plate portions are positioned adjacent to a respective end of the first and second carrying handles.

20. The portable cooking stove of claim 16, wherein the multiple leg attachment plate portions extend in a perpendicular arrangement relative to the first and second carrying handle.

* * * * *